United States Patent
Gurt Santanach et al.

(10) Patent No.: US 11,313,047 B2
(45) Date of Patent: Apr. 26, 2022

(54) METHOD OF TREATMENT AGAINST CORROSION AND AGAINST WEAR

(71) Applicants: SAFRAN HELICOPTER ENGINES, Bordes (FR); MESSIER-BUGATTI-DOWTY, Velizy-Villacoublay (FR)

(72) Inventors: Julien Gurt Santanach, Saint Vincent de Tyrosse (FR); Fabrice Crabos, Assat (FR); Julien Esteban, Strasbourg (FR)

(73) Assignees: SAFRAN HELICOPTER ENGINES, Bordes (FR); MESSIER-BUGATTI-DOWTY, Velizy-Villacoublay (FR)

( * ) Notice: Subject to any disclaimer, the term of this patent is extended or adjusted under 35 U.S.C. 154(b) by 0 days.

(21) Appl. No.: 15/105,906

(22) PCT Filed: Dec. 17, 2014

(86) PCT No.: PCT/FR2014/053375
§ 371 (c)(1),
(2) Date: Jun. 17, 2016

(87) PCT Pub. No.: WO2015/092265
PCT Pub. Date: Jun. 25, 2015

(65) Prior Publication Data
US 2016/0319453 A1    Nov. 3, 2016

(30) Foreign Application Priority Data
Dec. 18, 2013 (FR) ...................................... 1362920

(51) Int. Cl.
C25D 11/02 (2006.01)
C25D 11/08 (2006.01)
(Continued)

(52) U.S. Cl.
CPC ............ C25D 11/022 (2013.01); B64C 25/36 (2013.01); C23C 18/122 (2013.01);
(Continued)

(58) Field of Classification Search
CPC ........ C25D 11/022; C25D 11/12; C25D 11/18
See application file for complete search history.

(56) References Cited

U.S. PATENT DOCUMENTS 5,128,510 A * 7/1992 De Bruyn ............... B23K 11/28
219/89
6,685,816 B1 * 2/2004 Brattinga ............... C25D 11/04
205/118
(Continued)

FOREIGN PATENT DOCUMENTS

CA    2 696 282 A1    9/2010
CN    101149328 A    3/2008
(Continued)

OTHER PUBLICATIONS

Probert, R. H. "Aluminum How To" 2005, p. 104-105. (Year: 2005).*
(Continued)

*Primary Examiner* — Brian W Cohen
(74) *Attorney, Agent, or Firm* — Oblon, McClelland, Maier & Neustadt, L.L.P.

(57) ABSTRACT

Subjecting an aluminum or aluminum alloy substrate to anti-corrosion and anti-wear treatment that is applicable in particular in the field of aviation for protecting certain mechanical parts of airplanes or helicopters that are subjected simultaneously to corrosion and to wear, including applying to the substrate, a sol-gel treatment step forming a sol-gel layer; and after the sol-gel treatment step, a hard oxidation step forming a hard oxide layer.

4 Claims, 2 Drawing Sheets

(51) Int. Cl.
  *C25D 11/24* (2006.01)
  *C25D 11/12* (2006.01)
  *C25D 11/04* (2006.01)
  *C25D 11/16* (2006.01)
  *C25D 11/18* (2006.01)
  *C23C 18/12* (2006.01)
  *B64C 25/36* (2006.01)
  *F02C 7/22* (2006.01)

(52) U.S. Cl.
  CPC ...... *C23C 18/1241* (2013.01); *C23C 18/1245* (2013.01); *C23C 18/1254* (2013.01); *C23C 18/1295* (2013.01); *C25D 11/04* (2013.01); *C25D 11/08* (2013.01); *C25D 11/12* (2013.01); *C25D 11/16* (2013.01); *C25D 11/18* (2013.01); *C25D 11/246* (2013.01); *F02C 7/22* (2013.01)

(56) References Cited

U.S. PATENT DOCUMENTS

| | | | | |
|---|---|---|---|---|
| 8,398,841 | B2* | 3/2013 | Khosla | H05K 5/0243 205/324 |
| 8,486,249 | B2* | 7/2013 | Almond | C23C 24/04 205/115 |
| 10,385,470 | B2* | 8/2019 | Danzebrink | C23C 18/122 |
| 2003/0111455 | A1* | 6/2003 | Krings | A47J 36/02 219/245 |
| 2004/0188264 | A1 | 9/2004 | Brattinga et al. | |
| 2007/0228033 | A1* | 10/2007 | Lee | H01C 17/06586 219/543 |
| 2008/0111027 | A1* | 5/2008 | Blohowiak | C09D 4/00 244/133 |
| 2009/0114639 | A1* | 5/2009 | Werkman | D06F 75/24 219/543 |
| 2010/0330380 | A1* | 12/2010 | Colreavy | C09C 1/64 428/447 |
| 2011/0005922 | A1* | 1/2011 | Tai | H01J 37/32477 204/192.25 |
| 2013/0313247 | A1* | 11/2013 | Rubio | A47J 36/02 219/621 |
| 2015/0047349 | A1* | 2/2015 | Palko | F04D 25/024 60/605.3 |

FOREIGN PATENT DOCUMENTS

| | | |
|---|---|---|
| CN | 101736383 A | 6/2010 |
| JP | 2002-363772 A | 12/2002 |
| JP | 2003-514119 A | 4/2003 |
| JP | 2004-518506 A | 6/2004 |
| WO | 01/32965 A1 | 5/2001 |
| WO | 2006/126933 A1 | 11/2006 |
| WO | 2010/112122 | 10/2010 |

OTHER PUBLICATIONS

International Search Report dated Apr. 10, 2015 in PCT/FR2014/053375 Filed Dec. 17, 2014.
English translation of the Japanese Office Action dated Oct. 30, 2018 in Patent Application No. 2016-541255, 6 pages.
Chinese Office Action issued in Chinese Patent Application No. 201480069604.X dated Jul. 19, 2019, (English translation).
Canadian Office Action issued in Canadian Patent Application No. 2,933,963 dated Feb. 24, 2020, (w/ English Translation).
Office Action dated Mar. 12, 2020 in corresponding Korean Patent Application No. 10-2016-7019496 (English Translation only), 4 pages.

* cited by examiner

METHOD OF TREATMENT AGAINST CORROSION AND AGAINST WEAR

FIELD OF THE INVENTION

The present disclosure relates to a method of subjecting an aluminum or aluminum alloy substrate to treatment against corrosion and against wear. The disclosure also relates to a mechanical part including a coating obtained by such a treatment method and a turbine engine and landing gear including such a part.

Such a method is particularly useful specifically in the field of aviation for protecting certain mechanical parts of airplanes or helicopters that are subjected simultaneously to corrosion and to wear.

STATE OF THE PRIOR ART

In a turbine engine, in particular for a helicopter, certain parts made of aluminum or of aluminum alloy are subjected simultaneously to corrosion constraints and to wear constraints. For example, certain parts of the fuel regulation system need to slide against other parts, thereby generating friction; in addition, the repeated passage of fuel can lead to erosion of those parts: these friction and/or erosion zones thus need to be treated specifically against wear. In addition, these same parts are also in contact with the outside medium, which may be corrosive, in particular in the presence of moisture and most particularly in saline conditions, in particular when close to the sea: these parts therefore also need to be treated against corrosion over all of their zones that are not treated against wear.

In order to provide such protection, a method is known during which a first step of chromic anodic oxidation is performed on the part to provide protection against corrosion, and then a second step of hard anodic oxidation is performed on zones to be treated against wear.

Nevertheless, the bath used for performing chromic anodic oxidation contains certain dangerous ingredients, in particular Cr VI, which will soon be banned by REACh regulations.

Under such circumstances, another method devised for complying with REACh regulations seeks to replace the chromic anodic oxidation step with a step of sulfuric anodic oxidation.

Nevertheless, the hard anodic oxidation bath is capable of degrading the oxide layer as obtained in this way so that it is essential to perform an intermediate wax masking step in order to protect the zones of the anti-corrosion oxide layer that are to be conserved. This also adds a final step of de-waxing the part after hard anodic oxidation in order to obtain the final part. These additional steps, which are lengthy, expensive, and difficult, thus degrade the overall effectiveness and profitability of the method.

There therefore exists a real need for a method of subjecting an aluminum or aluminum alloy substrate to treatment against corrosion and against wear that does not suffer, at least to some extent, from the drawbacks inherent to the above-mentioned known methods.

SUMMARY OF THE INVENTION

The present disclosure relates to a method of subjecting an aluminum or aluminum alloy substrate to treatment against corrosion and against wear, the method comprising applying the following steps to the substrate, a sol-gel treatment step forming a sol-gel layer; and after the sol-gel treatment step, a hard oxidation step forming a hard oxide layer.

In the present disclosure, the term "layer" designates a region of given composition within the coating obtained by an anti-corrosion and anti-wear treatment method of the present disclosure: it may be a layer deposited on the substrate or a layer formed in the thickness of the initial substrate, e.g. by oxidizing the substrate.

In addition, in the present disclosure, the layers are not necessarily stacked one above another, some layers may be juxtaposed relative to others, and not superposed. In particular, the hard oxide layer may be provided so as to be adjacent to the sol-gel layer, but nevertheless without overlapping it.

By means of such a method using sol-gel treatment, it is possible very easily to obtain a coating for a mechanical part made of aluminum or aluminum alloy that presents very good properties of withstanding corrosion, as provided mainly by the sol-gel, and of withstanding wear, as provided mainly by the hard oxidation.

Sol-gel treatments, which are nowadays well known in the field of vitreous materials, enable vitreous materials to be obtained merely by polymerizing molecular precursors in solution, without passing via a melting step. Such treatments are particularly suitable for synthesizing hybrid organic/inorganic glasses. This organic/inorganic chemical composition, and the strong interatomic bonds of the sol-gel provide the sol-gel layer with very good barrier properties against the outside environment, and thus with very great resistance to corrosion, thereby enabling the mechanical parts to withstand atmospheric corrosion, including in marine, and thus saline, conditions for example.

Furthermore, this barrier effect enables it not to be degraded during the hard oxidation that generally takes place in corrosive baths: under such circumstances, the anti-corrosion properties of the coating are conserved even after prolonged immersion in a hard oxidation bath.

Because of the large content of organic compounds in the sol-gel, the sol-gel is also electrically insulating: under such circumstances, the electric current used during hard oxidation does not pass through the sol-gel layer, thereby avoiding degrading this layer and avoiding unwanted oxidation of the substrate under the layer. The sol-gel layer thus naturally forms a mask that protects the substrate against hard oxidation: in this way, only those zones that are not treated by the sol-gel or those zones from which the sol-gel layer has been withdrawn are affected by the hard oxidation. This makes it easy to define the layers that are to be treated against wear.

In addition, the wide range of existing sol-gels makes it possible to select those that provide the best desired properties and that comply best with the health and environmental constraints such as REACh regulations.

Furthermore, sol-gel treatment can be performed quickly and easily. This step can in particular be inserted easily in present production lines and is faster than the traditional chromic anodic oxidation step. In addition, such a method is easy to perform, including on parts where the zones to be treated are difficult to access.

In certain implementations, the hard oxidation step is hard anodic oxidation (HAO). The use of sol-gel treatment is particularly advantageous in such implementations since the sol-gel presents good resistance to acid, enabling it to withstand the acid bath for hard anodic oxidation.

In other implementations, the hard oxidation step is micro-arc hard oxidation. This step is preferably performed in a basic bath.

In certain implementations, the method further comprises an additional oxidation step, prior to the sol-gel treatment step, forming an additional oxide layer. Such double-layer protection associating an oxide layer with a sol-gel layer serves to reinforce the corrosion resistance of the coating. Furthermore, the sol-gel layer protects the additional oxide layer against the hard oxidation bath and thus prevents this layer being degraded.

In certain implementations, the additional oxidation step is sulfuric anodic oxidation (SAO), tartro-sulfuric anodic oxidation, or phosphoric anodic oxidation.

In certain implementations, the sol-gel treatment step takes place on the additional oxide layer without a prior step of filling in this layer. This filling-in step is not necessary since the sol-gel can itself fill in the pores in the thickness of the additional oxide layer, in part or in full.

In certain implementations, during the sol-gel treatment step, the sol-gel infiltrates into the pores of the additional oxide layer. This also reinforces the adhesion of the sol-gel layer on the additional oxide layer.

In certain implementations, the sol-gel treatment step comprises a sol-gel deposition substep and a sol-gel baking substep. Baking serves to cure the sol-gel.

In certain implementations, the sol-gel deposition substep is performed by dipping the substrate in a sol-gel bath.

In other implementations, the sol-gel deposition substep is performed by spraying the sol-gel on the substrate.

In certain implementations, the baking substep is performed in the range 100° C. to 200° C., preferably in the range 130° C. to 150° C.

In certain implementations, the baking substep lasts in the range 40 minutes (min) to 60 min.

In certain implementations, at least a portion of the sol-gel used comprises glycidoxypropyltrimethoxysilane.

In certain implementations, at least a portion of the sol-gel used is the sol-gel sold by ICS under the name IC23.5 (registered trademark). This sol-gel is particularly suitable for parts that are to come into contact with kerosene. Naturally, any other sol-gel having the same composition or an equivalent composition could equally well be used.

In other implementations, at least a portion of the sol-gel used is the sol-gel sold by ICS under the name 1K-EBSil (registered trademark). This sol-gel is particularly suitable for parts that are to come into contact with hydraulic fluids. Naturally, any other sol-gel having the same composition or an equivalent composition could equally well be used.

In particular, such sol-gels make it possible to withstand saline mist for a minimum of 500 hours (h) in compliance with the tests of ISO standard 9227.

In certain implementations, the method further includes a machining step performed between the sol-gel treatment step and the hard oxidation step, during which at least one zone for treatment is machined so as to eliminate at least the sol-gel layer from this zone. Such a step enables a zone of the substrate that is to be treated specifically against wear to be updated by locally removing the electrically insulating layer constituted by the sol-gel, thus enabling this zone to be subjected to hard oxidation. Naturally, certain parts may have a plurality of distinct zones to be treated specifically against wear, in which case a plurality of distinct zones may be machined. Because of this machining, the sol-gel layer and/or the hard oxide layer as obtained may be discontinuous.

In certain implementations, the method does not have any chromic anodic oxidation (CAO) step.

The present disclosure also provides a mechanical part comprising an aluminum or aluminum alloy substrate, and an anti-corrosion and anti-wear coating obtained by a method in accordance with any of the above implementations.

The present disclosure also provides a mechanical part having an aluminum or aluminum alloy substrate, a sol-gel layer, and an aluminum oxide layer.

In certain embodiments, the part also includes an additional aluminum oxide layer situated under the sol-gel layer.

In certain embodiments, the sol-gel is present in pores of the additional oxide layer.

In certain embodiments, at least a portion of the sol-gel is one of the above-mentioned sol-gels.

In certain embodiments, the sol-gel layer and the hard oxide layer are adjacent in the surface plane of the substrate but do not overlap.

In certain embodiments, the sol-gel layer presents thickness lying in the range 1 micrometer (μm) to 10 μm.

In certain embodiments, the hard oxide layer presents thickness lying in the range 40 μm to 100 μm.

In certain embodiments, the additional oxide layer presents thickness lying in the range 2 μm to 12 μm.

The present disclosure also relates to a turbine engine including a mechanical part in accordance with any of the above embodiments.

The present disclosure also provides landing gear including a mechanical part in accordance with any of the above embodiments.

The above characteristics and advantages, and others, appear on reading the following detailed description of implementations of the proposed method. This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified by the same reference signs. In addition, elements (or portions of an element) belonging to different implementations but presenting functions that are analogous are identified in the figures with numerical references incremented by 100, 200, etc.

DETAILED DESCRIPTION OF IMPLEMENTATIONS

In order to make the invention more concrete, implementations of the method are described below in detail with reference to the accompanying drawings. It should be recalled that the invention is not limited to these implementations.

FIGS. 1A to 1E show a first implementation of the method seeking to provide a substrate 10 made of aluminum or of aluminum alloy with a coating to provide protection against wear and corrosion. The substrate 10 shown in FIG. 1A may in particular be a hydromechanical part for regulating fuel in a helicopter turbine engine or it may be a flange for fastening a landing gear half-wheel, to mention but two examples.

Initially, the substrate 10 may be subjected to preliminary preparation steps, such as steps of degreasing, rinsing, and/or pickling.

Once the surface 10a of the substrate 10 has been made ready in this way, a liquid sol-gel layer 20 is applied to the surface 10a of the substrate 10. The sol-gel may in particular be the sol-gel commercialized by ICS under the name IC23.5 (registered trademark), in particular for applications in which the part 1 is to come into contact with kerosene; it could equally be the sol-gel sold by ICS under the name 1K-EBSil (registered trademark), in particular for applications where the part 1 is to come into contact with hydraulic fluids. Naturally, other sol-gels of equivalent composition, or having other compositions that present anti-corrosion properties, could equally well be used.

The liquid sol-gel layer 20 may be applied to the surface 10a of the substrate 10 with a brush, like a paint. The liquid sol-gel may also be sprayed against the surface 10a of the substrate 10, e.g. using a paint spray gun. In another example, the sol-gel could equally well be deposited by dipping the substrate 10 in a bath of liquid sol-gel.

Figure 1A:
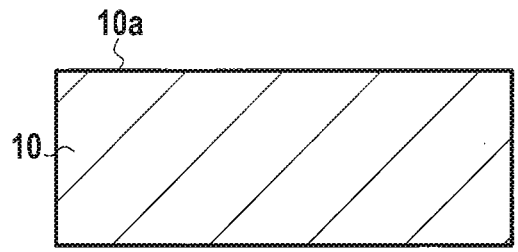
FIGS. 1A to 1E show various steps of a first implementation of the method.
Figure 1B:
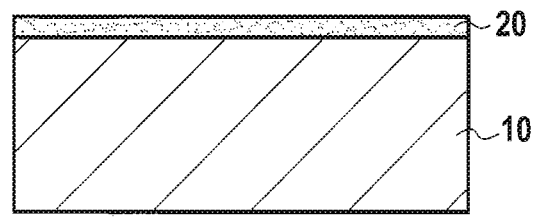
Figure 1C:
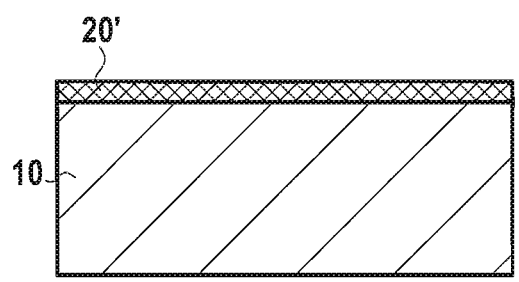

Once this sol-gel deposition step has been finished, the part shown in FIG. 1B is subjected to a baking step in an oven during which the sol-gel is cured. This baking step may be carried out in an oven at a temperature of about 140° for a duration of 50 min. At the end of this baking step, the FIG. 1C part is obtained in which a solidified sol-gel layer 20' covers the substrate 10, this solid sol-gel layer 20' providing the looked-for protection against corrosion.

Figure 1D:
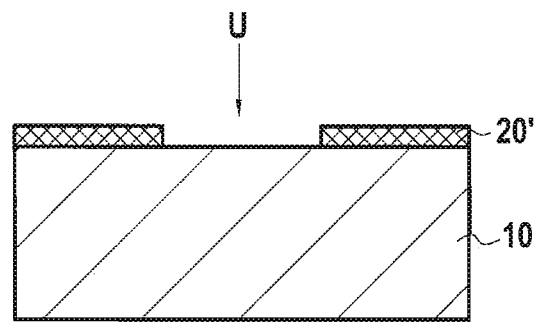

At the end of this step, the zone U of the part for treating specifically against wear is machined so as to remove the solid sol-gel layer 20' locally in order to uncover the substrate 10. The resulting part, as shown in FIG. 1D, can then be subjected to preparation steps such as degreasing and/or rinsing steps.

The part made ready in this way is then dipped in a bath of sulfuric acid in order to be subjected to hard anodic oxidation (HAO) during which a surface layer of the substrate 1 in the zone U for treating against wear as uncovered during the machining step is oxidized in order to form an alumina layer 30. This alumina layer 30 serves to locally reinforce the ability of the part 1 to withstand wear in the zone U.

Figure 1E:
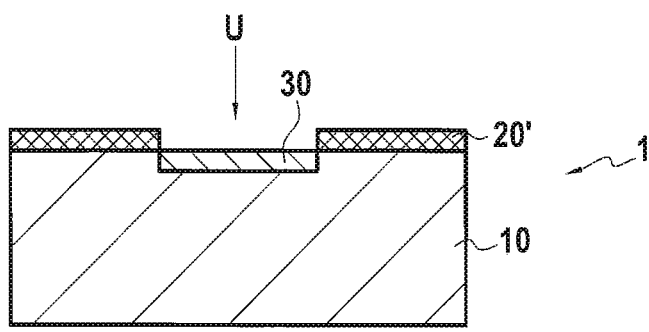

The part as obtained in this way can finally be subjected to finishing steps, in particular rinsing or machining steps in order to obtain the final part as shown in FIG. 1E. Such a final part 1 can thus include in the zone U subjected to anti-wear treatment, a hard alumina layer 30 having thickness lying in the range 40 μm to 100 μm, and outside the zone U, a solidified sol-gel layer 20 having thickness lying in the range 2 μm to 10 μm. Such a sol-gel layer 20' can withstand saline mist for longer than 500 h.

FIGS. 2A to 2F show a second implementation of the method seeking to provide a substrate 110 made of aluminum or of aluminum alloy with a coating providing protection against wear and corrosion.

Initially, the substrate 110 may be subjected to preparation steps such as degreasing, rinsing, and/or cleaning steps.

Figure 2A:
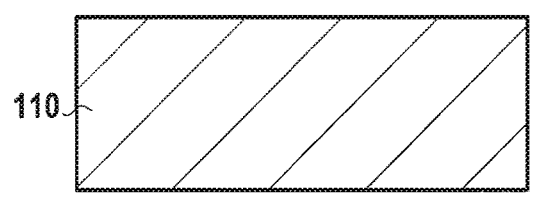
FIGS. 2A to 2F show various steps of a second implementation of the method.
Figure 2B:
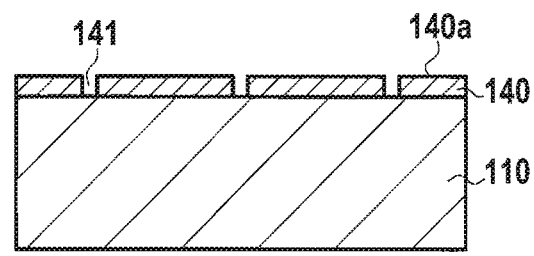
Figure 2C:
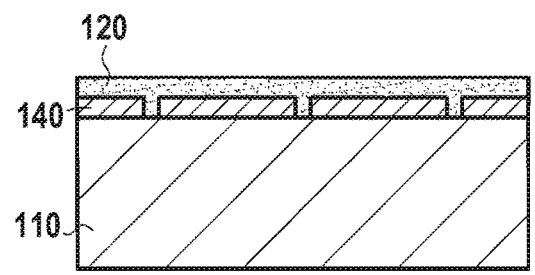

Once the surface 110a and the substrate 110 have been made ready in this way, the part is immersed in a bath of sulfuric acid so as to subject it to sulfuric anodic oxidation (SAO) during which a surface layer of the substrate 110 is oxidized to form a porous alumina layer 140, thus obtaining the part shown in FIG. 2B. In other examples, the bath could include tartro-sulfuric acid or indeed phosphoric acid so as to perform tartro-sulfuric anodic oxidation or phosphoric anodic oxidation, respectively.

The following steps of this second implementation of the method are substantially identical to those of the first implementation described above. A liquid sol-gel layer 120 is applied to the surface 140a of the porous alumina layer 140: the liquid sol-gel can then infiltrate in the pores 141 of the alumina layer 140 and fill them in. This produces the part shown in FIG. 2C.

Figure 2D:
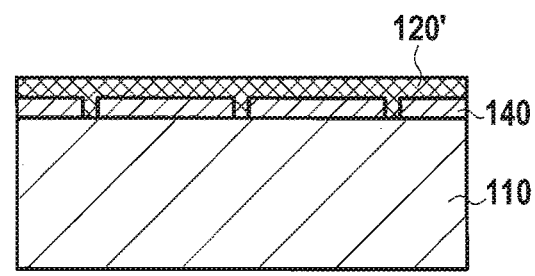

Once this sol-gel deposition step has been finished, the part is subjected to a baking step analogous to that of the first implementation, leading to the part shown in FIG. 2D in which a solidified sol-gel layer 120' covers and fills in the pores of the porous alumina layer 140.

Figure 2E:
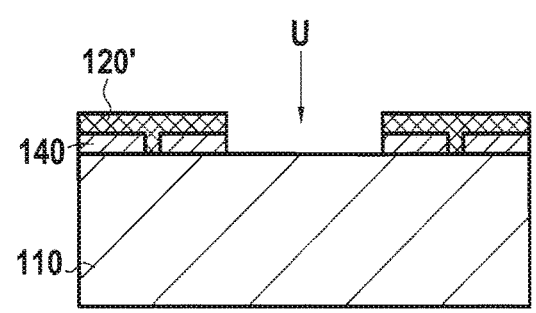

At the end of this step, the zone U of the part that is to be treated specifically against wear is machined so as to remove locally both the solidified sol-gel layer 120' and the porous alumina layer 140 so as to uncover the non-oxidized portion of the substrate 110. The part as obtained in this way, as shown in FIG. 2E, can then be subjected to preparation steps such as degreasing and/or rinsing steps.

The part as made ready in this way is then dipped in a bath of sulfuric acid in order to obtain hard anodic oxidation (HAO) during which a surface layer of the substrate 110 in the zone U for treating against wear and uncovered during the machining step is oxidized so as to form a hard alumina layer 130.

Figure 2F:
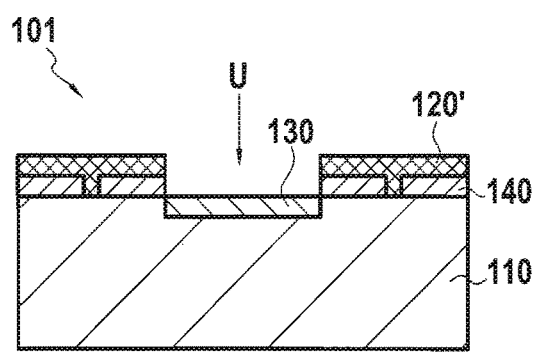

The part as obtained in this way may finally be subjected to finishing steps, in particular rinsing or machining step in order to obtain the final part 101 as shown in FIG. 2F. Such a final part 101 may thus include in the zone U that has been subjected to anti-wear treatment, a hard alumina layer 130 having thickness lying in the range 40 μm to 100 μm, and outside this zone U, an alumina layer 140 having thickness lying in the range 2 μm to 12 μm surmounted by a solidified sol-gel layer 120' having thickness lying in the range 1 μm to 10 μm, the pores of the alumina layer 140 also being filled in with the sol-gel. Such an alumina layer 140 associated with a sol-gel layer 120' is capable of withstanding saline mist for longer than 700 h.

The implementations described in the present disclosure are given by way of non-limiting illustration, and a person skilled in the art can easily, in the light of this disclosure, modify these implementations or can envisage others, while remaining within the scope of the invention.

Furthermore, the various characteristics of these implementations may be used singly or in combination with one another. When they are combined, the characteristics may be combined as described above or in other ways, the invention not being limited to the specific combinations described in the present disclosure. In particular, unless specified to the contrary, a characteristic described with reference to one particular implementation may be applied in analogous manner to any other implementation.

The invention claimed is:

1. A method of subjecting an aluminum or aluminum alloy substrate to treatment against corrosion and against wear, the method comprising:
   forming a first oxide layer on a surface of the substrate, the first oxide layer being porous and including pores;
   applying a sol-gel layer to the first oxide layer, the sol-gel filling in the pores of the first oxide layer;
   locally removing only the first oxide layer and the sol-gel layer at a zone of the substrate such that the surface of substrate at the zone of the substrate is free of the first oxide layer and the sol-gel layer and a geometry of the surface of the substrate at the zone of the substrate is unchanged; and forming a second oxide layer at the zone of the substrate, the second oxide layer being a hard oxide layer, wherein a thickness of the hard oxide layer is in a range of 40 μm to 100 μm, wherein the applying the sol-gel layer comprises a sol-gel deposition substep and a sol-gel baking substep, wherein the sol-gel baking substep is performed at a temperature in a range of 100° C. to 200° C. for a duration in a range of 40 minutes to 60 minutes so as to present a solidified sol-gel layer, wherein the hard oxide layer does not overlap the first oxide layer and the solidified sol-gel layer, wherein outside of the zone of the substrate, the first oxide layer presents a thickness in a range of 2 μm to 12 μm surmounted by the solidified sol-gel layer presenting a thickness in a range of 1 μm to 10 μm, the pores of the first oxide layer being filled in with the sol-gel, wherein the applying the sol-gel takes place on the first oxide layer without a prior step of filling in the first oxide layer, and wherein at least a portion of the sol-gel comprises glycidoxypropyltrimethoxysilane.

2. The method according to claim 1, wherein the second oxide layer is formed by hard anodic oxidation (HAO).

3. The method according to claim 1, wherein the first oxide layer is formed by sulfuric anodic oxidation (SAO), tartro-sulfuric anodic oxidation, or phosphoric anodic oxidation.

4. The method according to claim 1, wherein the hard oxide layer is a hard alumina layer.

* * * * *